US010496575B1

(12) United States Patent
Chen et al.

(10) Patent No.: US 10,496,575 B1
(45) Date of Patent: Dec. 3, 2019

(54) MULTI-PROTOCOL DETERMINING METHOD BASED ON CAN BUS

(71) Applicants: NATIONAL CHIN-YI UNIVERSITY OF TECHNOLOGY, Taichung (TW); Candomo CO., Ltd., Nantou County (TW)

(72) Inventors: Chi-Chun Chen, Taichung (TW); San-Fu Wang, Keelung (TW); Cheng-Wei Yang, Taichung (TW); Wei-Hsuan Chang, Taichung (TW); Hui-Jyun Feng, Taoyuan (TW)

(73) Assignees: NATIONAL CHIN-YI UNIVERSITY OF TECHNOLOGY, Taichung (TW); Candomo CO., Ltd., Nantou County (TW)

( * ) Notice: Subject to any disclaimer, the term of this patent is extended or adjusted under 35 U.S.C. 154(b) by 0 days.

(21) Appl. No.: 16/439,688

(22) Filed: Jun. 12, 2019

(51) Int. Cl.
*G06F 13/36* (2006.01)
(52) U.S. Cl.
CPC .................. *G06F 13/36* (2013.01)
(58) Field of Classification Search
CPC ....................................................... G06F 13/36
See application file for complete search history.

(56) References Cited

U.S. PATENT DOCUMENTS

2008/0195299 A1\* 8/2008 Barnicle ............... G08C 17/02
701/115

FOREIGN PATENT DOCUMENTS

CN 101960789 A 1/2011
TW 200514386 A 4/2005

\* cited by examiner

*Primary Examiner* — Idriss N Alrobaye
*Assistant Examiner* — Ronald T Modo
(74) *Attorney, Agent, or Firm* — CKC & Partners Co., LLC

(57) ABSTRACT

A multi-protocol determining method based on a CAN bus is provided, which includes a mode setting step and two or more modes are set in a controller of the CAN bus. The multi-protocol determining method based on the CAN bus includes a listening step, and the modes are taken turns to read a packet from the communicated node. The multi-protocol determining method based on the CAN bus further includes a confirming step. In the confirming step, if the packet is received successfully by one of the modes, the CAN bus is set to work in the corresponding mode. The controller sends one or more requesting packets, each having a communicating request based on a predetermined protocol, to the communicated node, and if the controller receives a feedback packet from the communicated node successfully, the protocol of the communicated node is identified to be the predetermined protocol.

5 Claims, 4 Drawing Sheets

MULTI-PROTOCOL DETERMINING METHOD BASED ON CAN BUS

BACKGROUND

Technical Field

The present disclosure relates to a multi-protocol determining method. More particularly, the present disclosure relates to a multi-protocol determining method based on a control area network (CAN) bus.

Description of Related Art

There are many types of commercial vehicles, such as light or large buses, light or heavy truck, and estate cars. Such vehicles are produced in USA, Japan or Europe, and use ISO protocol or SAE protocol.

However, new vehicles produced in USA are regulated to use the CAN bus interface from 2008. The vehicles have to provide an On Board Diagnostic II (OBD-II) connector, and the heavy duty vehicles has to be communicated based on SAE-J1939 while other vehicles are communicated based on ISO-15031/SAE-J1979. Moreover, new protocol, WWH-OBDII, has been developed, and some new vehicles can be communicated based on ISO-27145. Hence, how to communicate with vehicles having different protocols is a problem needed to be solved.

Some practitioners develop a gateway which can be connected between two CAN buses, i.e., the first CAN bus and the second CAN bus, having different protocols. The gateway can receive a message from the first CAN bus with one protocol and translate the message based on the other protocol. Subsequently, the gateway can send the translated message to the second CAN bus. Since the protocols used in both the first CAN bus and the second CAN bus have to be known before translation, the usage thereof is limited.

Therefore, how to identify protocols of a communicated node of the vehicle or of a CAN bus becomes a pursuit target.

SUMMARY

A multi-protocol determining method based on a CAN bus is provided. The multi-protocol determining method based on the CAN bus is applied to connect to a communicated node to confirm one or more protocols of the communicated node and includes a mode setting step. In the mode setting step, two or more modes are set in a controller of the CAN bus. Each of the modes includes a baud rate and an ID length. The baud rates of the two or more modes are different, or the ID lengths of the two or more modes are different. The multi-protocol determining method based on the CAN bus includes a listening step. In the listening step, the two or more modes are taken turns to read a packet from the communicated node. The multi-protocol determining method based on the CAN bus further includes a confirming step to process a first judging procedure if the packet is received successfully by one of the two or more modes and to process a second judging procedure if the packet is not received by any of the two or more modes. In the first judging procedure, the CAN bus is set to work in the mode which receives the packet successfully. The controller sends one or more requesting packets, each having a communicating request based on a predetermined protocol, to the communicated node, and if the controller receives a feedback packet from the communicated node successfully, one of the one or more protocols of the communicated node is identified to be the predetermined protocol. In the second judging procedure, the CAN bus is set to work in each of the two or more modes in turn to send the one or more requesting packets, and if the controller receives the feedback packet from the communicated node successfully, one of the one or more protocols of the communicated node is identified to be the predetermined protocol.

A multi-protocol determining method based on a CAN bus is provided. The multi-protocol determining method based on the CAN bus is applied to connect to a communicated node to confirm one or more protocols of the communicated node and includes a mode setting step. In the mode setting step, two or more modes are set in a controller of the CAN bus. Each of the modes includes a baud rate and an ID length. The baud rates of the two or more modes are different, or the ID lengths of the two or more modes are different. The multi-protocol determining method based on the CAN bus includes a listening step. In the listening step, the two or more modes are taken turns to read a packet from the communicated node. The multi-protocol determining method based on the CAN bus further includes a confirming step. In the confirming step, if the packet is received successfully by one of the two or more modes, the CAN bus is set to work in the mode which receives the packet successfully. The controller sends one or more requesting packets, each having a communicating request based on a predetermined protocol, to the communicated node, and if the controller receives a feedback packet from the communicated node successfully, the protocol of the communicated node is identified to be the predetermined protocol.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as be "disposed on", "connected to" or "coupled to" another element, it can be directly disposed on, connected or coupled to the other element, or it can be indirectly disposed on, connected or coupled to the other element, that is, intervening elements may be present. In contrast, when an element is referred to as be "directly disposed on," "directly connected to" or "directly coupled to" another element, there are no intervening elements present.

In addition, the terms first, second, third, etc. is used herein to describe various elements or components, these elements or components should not be limited by these terms. Consequently, a first element or component discussed below could be termed a second element or component.

Figure 1:
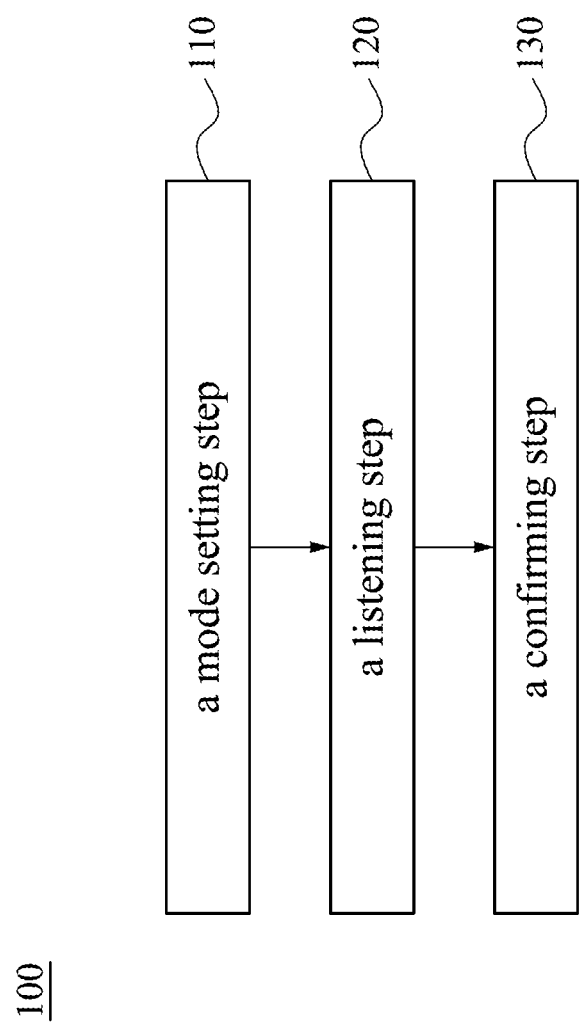
FIG. 1 shows a block chart of a multi-protocol determining method based on a CAN bus according to one embodiment of the present disclosure.

FIG. 1 shows a block chart of a multi-protocol determining method 100 based on a CAN bus according to one embodiment of the present disclosure. The multi-protocol determining method 100 based on the CAN bus is applied to connect to a communicated node (not shown) to confirm one or more protocols of the communicated node. The multi-protocol determining method 100 based on the CAN bus includes a mode setting step 110, a listening step 120 and a confirming step 130.

In the mode setting step 110, two or more modes are set in a controller of the CAN bus. Each of the modes includes a baud rate and an ID length. The baud rates of the two or more modes are different, or the ID lengths of the two or more modes are different.

In the listening step 120, the two or more modes take turns to read a packet from the communicated node.

In the confirming step 130, if the packet is received successfully by one of the two or more modes, the CAN bus is set to work in the mode which receives the packet successfully. The controller sends one or more requesting packets, each having a communication request based on a predetermined protocol, to the communicated node, and if the controller receives a feedback packet from the communicated node successfully, the protocol of the communicated node is identified to be the predetermined protocol.

Hence, through the listening step 120 and the confirming step 130, the one or more protocols of the communicated node can be identified, which facilitates the reception of data, the control of elements and the diagnosis procedure. The details of the multi-protocol determining method 100 based on the CAN bus will be described in the following paragraphs.

In the mode setting step 110, a plurality of modes can be set based on different protocols in the world. For example, the baud rates of SAE-J1939 can be 500 kbps or 250 kbps, and the ID length of SAE-J1939 is 29 bits. Additionally, the ID lengths of ISO-27145 and ISO-15031/SAE-J1979 can be 29 bits or 11 bits. Therefore, through setting several modes in advance, the corresponding packets can be received.

In the listening step 120, the controller can be configured to listen only mode which can only receive packets satisfying a specific mode but cannot send or respond messages. Hence, if no packet is received successfully while listening based on one of the modes for a waiting time, the possible reason is that the mode may not match the packet. Subsequently, the CAN bus can listen based on another one of the modes for the waiting time, and the waiting time can be set by a user.

In the confirming step 130, the protocol of the communicated node is identified. If a packet is received successfully by one of the modes when the CAN bus is listening, it can be deemed that the corresponding mode matches the packet. Consequently, the CAN bus can be set to work in the corresponding mode to process a first judging procedure to identify the one or more protocols of the communicated node.

Precisely, in the first judging procedure, judging whether the ID length of the mode that receives the packet successfully is equal to 29 bits, and if the ID length is equal to 29 bits, the protocol of the communicated node is identified to be SAE-J1939, and the controller then sends another request packet to confirm whether any other one of the protocols of the communicated node is identical to the predetermined protocol which is different from SAE-J1939.

In other words, judging whether the ID length is equal to 29 bits can also identify whether one of the protocols of the communicated node is SAE-J1939. Moreover, by sending different requesting packets, whether the communicated node has other protocols can be confirmed. For example, in one embodiment, a number of the one or more requesting packets is two. The predetermined protocol of one of the requesting packet is IS0-27145, and the predetermined protocol of the other one of the requesting packet is ISO-15031/SAE-J1979. The disclosure is not limited thereto.

If the requesting packet is sent when the CAN bus is set to work in a mode with the ID length of 29 bits, and no feedback packet is received by the controller, the CAN bus is changed to work in another mode with the ID length of 11 bits to send the requesting packet. Moreover, ISO-27145 has 29 bits identifier or 11 bits identifier, and ISO-15031/SAE-J1979 has 29 bits identifier or 11 bits identifier. The communicated node of the same vehicle may have two protocols: SAE-J1939 with 29 bits identifier and ISO-15031/SAE-J1979 with 11 bits identifier. Hence, through the multi-protocol determining method 100 based the CAN bus, every protocol of the communicated node can be identified.

Additionally, if the packet is not received successfully by any of the modes, a second judging procedure is processed. In the second judging procedure, the CAN bus is set to work in each of the modes in turn to send the requesting packets, and if the controller receives a feedback packet from the communicated node successfully, one of the protocols of the communicated node is identified to be the predetermined protocol.

In this situation, it is assumed that communicated node has a gateway and is protected by the gateway owing to that no packet is received successfully. Hence, the CAN bus can work in a first one of the modes to send the packet without damaging the communicated node. Subsequently, the CAN bus can be set to work in other modes in turn to send the requesting packets until the feedback packet is received successfully.

Figure 2A:
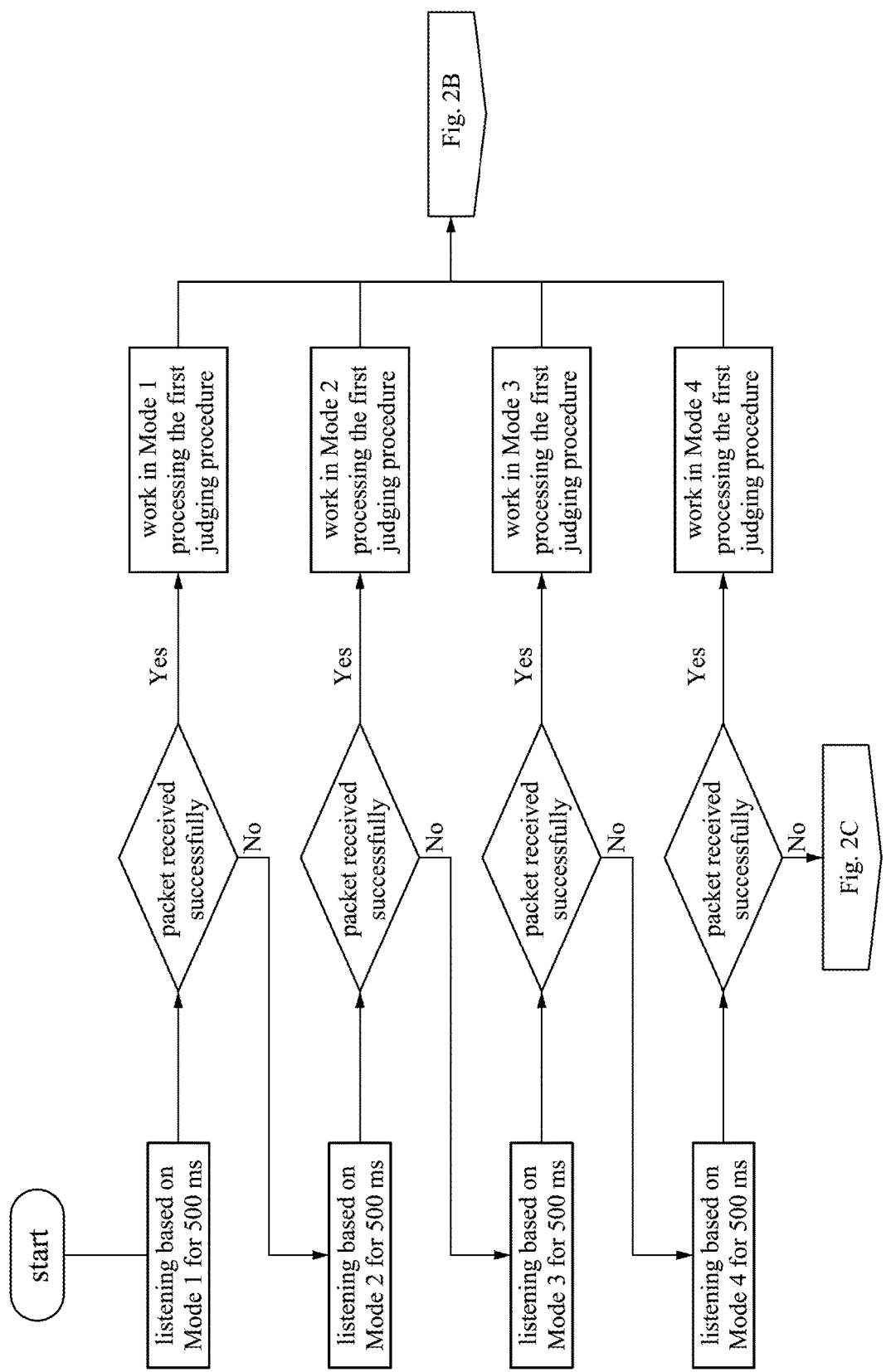
FIGS. 2A, 2B and 2C show a flow chart of the multi-protocol determining method based on the CAN bus of FIG. 1.
Figure 2B:
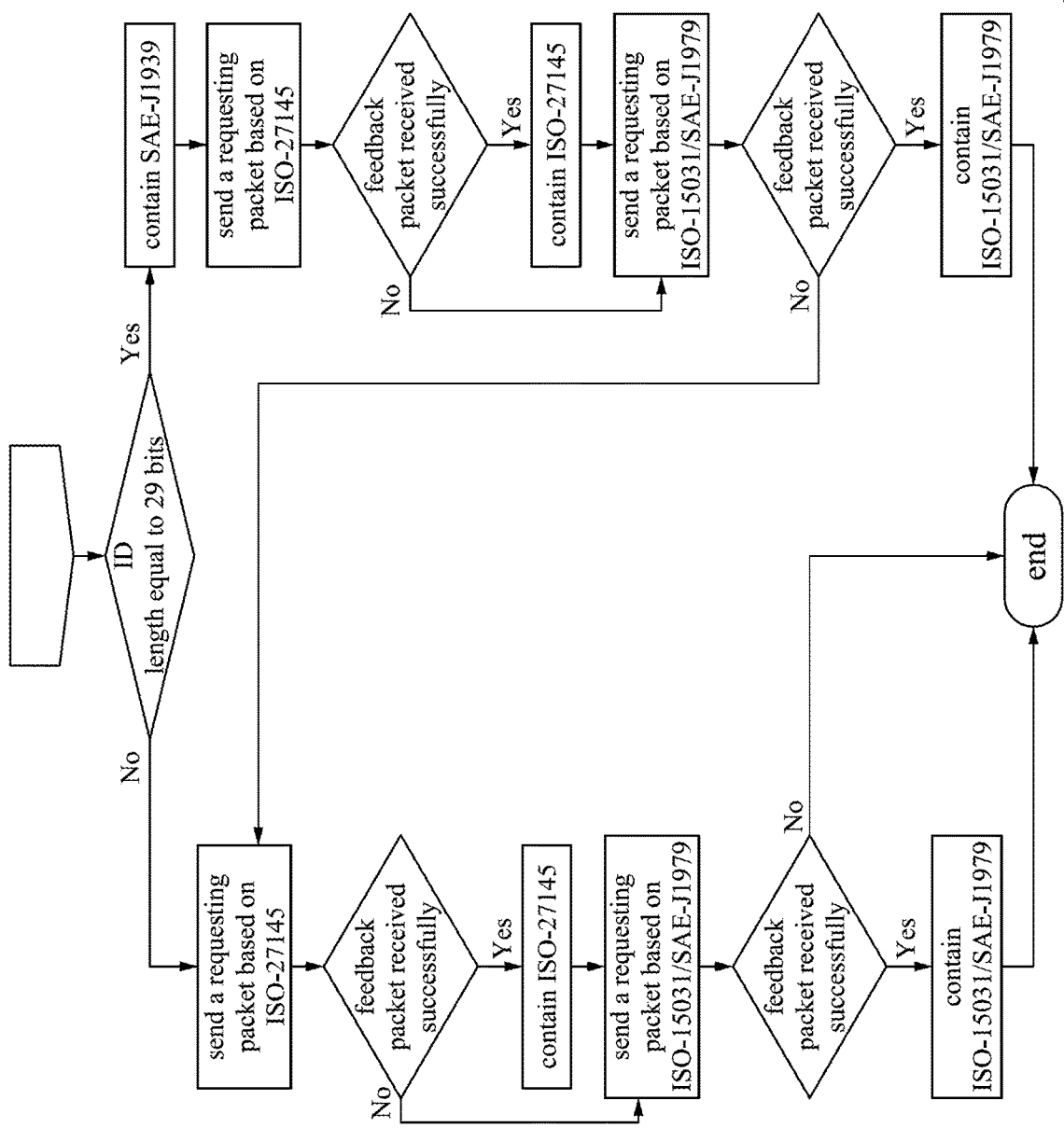
Figure 2C:
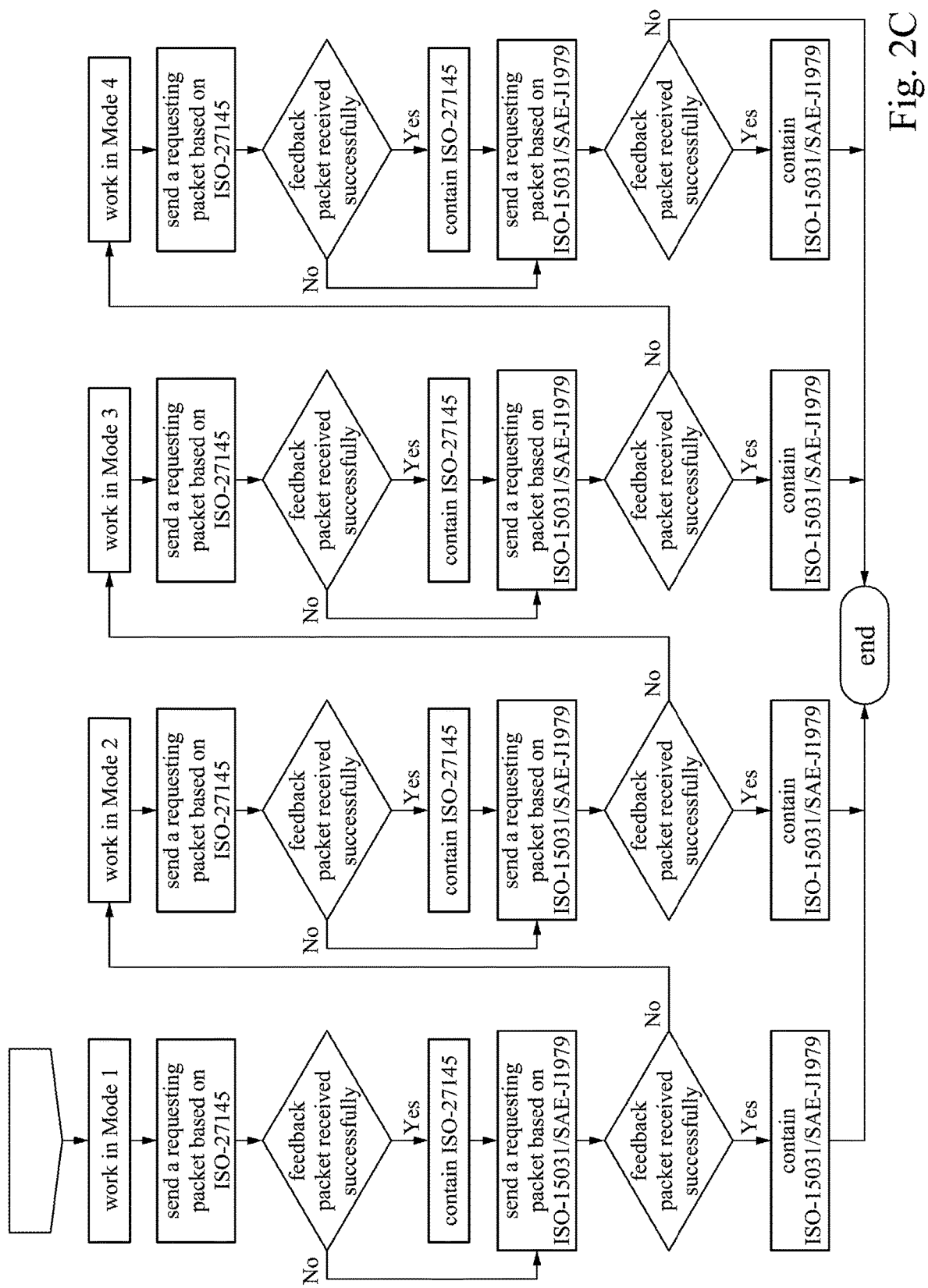

FIGS. 2A, 2B and 2C show a flow chart of the multi-protocol determining method 100 based on the CAN bus of FIG. 1. In the embodiment, four modes are set. The baud rates thereof are, sequentially, 500 kbps, 250 kbps, 500 kbps, 250 kbps, respectively, and the ID lengths thereof are, sequentially, 29 bits, 29 bits, 11 bits, and 11 bits, respectively. To be more specific, Mode 1 has a baud rate of 500 kbps and an ID length of 29 bits. Mode 2 has a baud rate of 250 kbps and an ID length of 29 bits. Mode 3 has a baud rate of 500 kbps and an ID length of 11 bits. Mode 4 has a baud rate of 250 kbps and an ID length of 11 bits. The waiting time is set to 500 ms, and the predetermined protocol can be ISO-27145 or ISO-15031/SAE-J1979.

As shown in FIG. 2A, at the beginning, the CAN bus is in the listen only mode with Mode 1, and if no packet is received successfully after 500 ms, the CAN bus will be in the listen only mode with Mode 2. Mode 1 to Mode 4 are taken in turn. If the packet is received by any of Mode 1 to Mode 4, the CAN bus is set to work in the corresponding mode which receives the packet successfully and the first judging procedure is processed. On the contrary, if no packet is received after the CAN bus is in the listen only mode running from Mode 1 to Mode 4, the second judging procedure is processed.

As shown in FIG. 2B, the ID length of the corresponding mode can be judged first in the first judging procedure. If the ID length is equal to 29 bits, one protocol of the communicated node can be identified to SAE-J1939. In other words, the communicated node can be communicated with the controller of the CAN bus based on SAE-J1939. Subsequently, the controller will send a requesting packet with an ID length of 29 bits based on a predetermined protocol of ISO-27145 to request the PID of the communicated node and start communication. If a feedback packet is received, another protocol of the communicated node can be identified to ISO-27145 with 29 bits identifier. Moreover, even no feedback packet is received, the controller will still send another requesting packet with an ID length of 29 bits based on a predetermined protocol of ISO-15031/SAE-J1979 to request the PID of the communicated node and start communication. If the feedback packet is received, another protocol of the communicated node can be identified to ISO-15031/SAE-J1979 with 29 bits identifier.

Furthermore, if the feedback packet corresponding to ISO-15031/SAE-J1979 is not received, the controller will send a requesting packet with an ID length of 11 bits based on a predetermined protocol of ISO-27145 and a requesting packet with an ID length of 11 bits based on a predetermined protocol of ISO-15031/SAE-J1979 in turn.

If the ID length of the corresponding mode is judged to be equal to 11 bits in the first judging procedure, it is sure that the communicated node does not have SAE-J1939. Then the controller will send a requesting packet with an ID length of 11 bits based on a predetermined protocol of ISO-27145 to request the PID of the communicated node and start communication. If a feedback packet is received, another protocol of the communicated node can be identified to ISO-27145 with 11 bits identifier. Moreover, even no feedback packet is received, the controller will still send another requesting packet with an ID length of 11 bits based on a predetermined protocol of ISO-15031/SAE-J1979 to request the PID of the communicated node and start communication. If the feedback packet is received, another protocol of the communicated node can be identified to ISO-15031/SAE-J1979 with 11 bits identifier.

Hence, if a packet is received successfully in Mode 1 (500 kbps, 29 bits), and no feedback packet is received after sending a requesting packet based on ISO-27145 but a feedback packet is received after sending a requesting packet based on ISO-15031/SAE-J1979, it is sure that the communicated node has SAE-J1939 and ISO-15031/SAE-J1979 with 29 bits identifier. Additionally, if a packet is received successfully in Mode 2 (250 kbps, 29 bits), and no feedback packet is received after sending requesting packets based on ISO-27145 and ISO-15031/SAE-J1979, respectively, but feedback packets are received after sending requesting packets with the ID length of 11 bits based on ISO-27145 and ISO-15031/SAE-J1979, respectively, it is sure that the communicated node has SAE-J1939, ISO-27145 with 11 bits identifier and ISO-15031/SAE-J1979 with 11 bits identifier.

As shown in FIG. 2C, since no feedback packet is received in any of Mode 1 to Mode 4, the CAN bus can be set to work in Mode 1 first to send a requesting packet based on ISO-27145 to request the PID of the communicated node and start communication. If a feedback packet is received, one protocol of the communicated node can be identified to ISO-27145 with 29 bits identifier. Moreover, even no feedback packet is received, the controller will still send another requesting packet based on a predetermined protocol of ISO-15031/SAE-J1979 to request the PID of the communicated node and start communication. If the feedback packet is received, another protocol of the communicated node can be identified to ISO-15031/SAE-J1979 with 29 bits identifier. On the contrary, if no feedback packet is received, the CAN bus will work in Mode 2 to confirm the protocols of the communicated node. Mode 1 to Mode 4 are taken turns to complete the process.

Based on the abovementioned embodiment, the multi-protocol determining method 100 based on the CAN bus can identify the protocols of the communicated node, which facilitates transition and reception of data as well as the integer of different equipment and systems of vehicles.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A multi-protocol determining method based on a control area network (CAN) bus, which is applied to connect to a communicated node to confirm one or more protocols of the communicated node, comprising:
   providing a mode setting step, wherein two or more modes are set in a controller of the CAN bus, each of the two or more modes comprises a baud rate and an ID length, wherein the baud rates of the two or more modes are different, or the ID lengths of the two or more modes are different;
   providing a listening step, wherein the two or more modes are taken turns to read a packet from the communicated node;
   providing a confirming step to process a first judging procedure if the packet is received successfully by one of the two or more modes or to process a second judging procedure if the packet is not received by any of the two or more modes;
   wherein in the first judging procedure, the CAN bus is set to work in the mode which receives the packet successfully, the controller sends one or more requesting packets, each having a communicating request based on a predetermined protocol, to the communicated node, and if the controller receives a feedback packet from the communicated node successfully, one of the one or more protocols of the communicated node is identified to be the predetermined protocol;
   wherein in the second judging procedure, the CAN bus is set to work in each of the two or more modes in turn to send the one or more requesting packets, and if the controller receives the feedback packet from the communicated node successfully, one of the one or more protocols of the communicated node is identified to be the predetermined protocol.

2. The multi-protocol determining method based on the CAN bus of claim 1, wherein in the first judging procedure, judging whether the ID length of the mode that receives the packet successfully is equal to 29 bits, and if the ID lengths thereof is equal to 29 bits, the protocol of the communicated node is identified to be SAE-J1939.

3. The multi-protocol determining method based on the CAN bus of claim 1, wherein in the first judging procedure and the second judging procedure, a number of the one or more requesting packets is two, the predetermined protocol of one of the requesting packets is ISO-27145, and the predetermined protocol of the other one of the requesting packets is ISO-15031/SAE-J1979.

4. The multi-protocol determining method based on the CAN bus of claim 1, wherein in the listening step, listen based on one of the two or more modes for a waiting time, and if the packet is not received successfully, listen based on another one of the two or more modes for the waiting time.

5. The multi-protocol determining method based on the CAN bus of claim 1, wherein in the mode setting step, a number of the two or more modes is four, the baud rates thereof are, sequentially, 500 kbps, 250 kbps, 500 kbps, 250 kbps, respectively, and the ID lengths thereof are, sequentially, 29 bits, 29 bits, 11 bits, and 11 bits, respectively.

\* \* \* \* \*